United States Patent
Kelly, Jr. et al.

[11] 3,807,664
[45] Apr. 30, 1974

[54] SELF-CONTAINED AIRCRAFT TAXIING SYSTEM

[75] Inventors: Joe A. Kelly, Jr.; Wilbur A. Blackmon; Carroll B. Gambill, all of Winston-Salem, N.C.

[73] Assignee: Barry J. Nace, Silver Spring, Md. ; a part interest

[22] Filed: Sept. 21, 1971

[21] Appl. No.: 182,314

[52] U.S. Cl................ 244/50, 180/65 F, 180/66 F, 244/103 R
[51] Int. Cl............................................. B64c 25/50
[58] Field of Search.. 244/50, 110 R, 103 R, 110 H; 180/55, 65 F, 65 R, 65 A, 55, 66 F, 180/66 R, 14 R, 14 C, 14 D, 14 E; 60/6, 19, 404, 405

[56] References Cited
UNITED STATES PATENTS

| | | | |
|---|---|---|---|
| 1,812,143 | 6/1931 | Dugan | 244/50 |
| 2,460,387 | 2/1949 | Hunter | 244/50 |
| 2,507,440 | 5/1950 | Hanson | 244/50 |
| 2,869,662 | 1/1959 | Koup | 180/55 |
| 2,911,168 | 11/1959 | Moreland | 244/50 |
| 2,993,549 | 7/1961 | Davis et al. | 180/55 X |
| 3,344,879 | 10/1967 | Glomb et al. | 180/55 |
| 3,469,646 | 9/1969 | O'Connor | 180/55 X |
| 3,469,648 | 9/1969 | Cannon | 180/55 X |
| 3,502,166 | 3/1970 | Christenson et al. | 180/55 |
| 3,581,682 | 6/1971 | Kontranowski | 180/55 |
| 3,005,510 | 10/1961 | Phillips | 180/14 E |
| 3,067,831 | 12/1962 | Willock | 180/66 F |
| 3,211,400 | 10/1965 | Booth | 244/50 |
| 3,302,741 | 2/1967 | Brazuk | 180/66 F X |
| 3,446,459 | 5/1969 | Smith et al. | 244/50 |
| 3,711,043 | 1/1973 | Cameron-Johnson | 180/55 |

FOREIGN PATENTS OR APPLICATIONS

| | | | |
|---|---|---|---|
| 1,224,618 | 9/1966 | Germany | 244/110 R |
| 1,368,754 | 6/1964 | France | 244/50 |

Primary Examiner—Milton Buchler
Assistant Examiner—Paul E. Sauberer
Attorney, Agent, or Firm—Barry J. Nace

[57] ABSTRACT

This invention is a self-contained aircraft taxiing system. By this invention aircraft can be made to move about on the ground without the assistance of any external power. This invention eliminates the need for an external force to pull, push, or otherwise move an airplane. This invention is further a means of reducing air pollution and reducing the amount of noise which is prevalent in the vicinity of today's modern airports.

18 Claims, 5 Drawing Figures

PATENTED APR 30 1974 3,807,664

Joe A. Kelly Jr.
Wilbur A. Blackmon
Carroll B. Gambill
INVENTORS

BY Barry J. Nace

ATTORNEY

Joe A. Kelly Jr.
Wilbur A. Blackmon
Carroll B. Gambill
INVENTORS

Barry J. Nace
ATTORNEY

SELF-CONTAINED AIRCRAFT TAXIING SYSTEM

BACKGROUND OF THE INVENTION

Prior Art

As aircraft have increased in size there has been a corresponding increase in the size and/or number of jet engines and consequently an increase in pollution in and around airports. As is well-known in the industry the engines of an aircraft are used to move the aircraft around an airport particularly when taxiing to and from a runway and frequently the engines are run at a high percentage of their capability at these times. The use of these engines for ground movement purposes, particularly for modern aircraft, have caused many problems such as violent air disturbances in the vicinity of the aircraft, uncomfortable noise and air pollution, and the like. Further, the increasing size of the jet aircraft and the use of its giant jet engines has increased the amount, and as a result the cost, of fuel consumption required to move the aircraft about the airfield; has increased the cost, amount and size of ground equipment necessary to move the aircraft; has increased the amount of spacing necessary between aircraft which are taxiing into take-off position thereby slowing the ingress and egress of aircraft; and has necessitated an increase in the need for wider taxiways to cope with the problem of protecting the jet engines from mechanically damaging, costly, and unsafe ingestion of foreign objects, e.g., gravel, bolts, nuts, rocks and the like.

As stated heretofore, when moving about an airport facility jet aircraft generally find it necessary to frequently run their jet engines at a high level of thrust, in order to get the aircraft moving and to sustain this movement. This, of course, consumes large quantities of fuel which results in large amounts of air pollution. In addition this fuel consumption while taxiing results in needless economic loss. Of course, the use of the jet engines causes severe noise pollution.

Further, the great weight of today's modern aircraft causes excessive wear and tear on the aircraft's tires at the time of touchdown.

Several methods have been used to cope with the problems and have generally fallen into three major areas. The first, and commonly used method, consists of using a large, powerful tractor equipped with a towing bar which is attached to the landing gear of the aircraft. The size of the towing equipment is, of course, directly dependent upon the weight of the aircraft to be towed. Thus as the size and weight of the aircraft has increased, so has the size and weight of the towing equipment until it has reached to uneconomical and unwieldy size.

Another method consists of attaching a device to the external area of the main landing gear tires and then using a friction drive to supply torque to the wheels. This method has proven impracticable for numerous reasons such as increased wear and tear on the wheels with a corresponding decrease in their period of effectiveness. Additionally, the friction necessary to move the aircraft about is reduced when wet conditions prevail.

Yet another method consists of using a vehicle which is designed to move under the fuselage of the aircraft and attach to the landing gear to enable movement. This, too, has proven unsuccessful due to poor application of power, thus making the movement of the modern aircraft virtually impossible. Some of the more advanced vehicles that have been suggested are controlled by the aircraft's pilot. These vehicles have also been found to be inadequate as they too require the use of the jet engines or an expensive externally powered vehicle.

The previously described methods as well as others which have been attempted have all had at least one and generally many of the following drawbacks: excessive consumption of fuel, excessive manpower requirements, expensive external towing equipment, excessive air and other pollution in and around the airport, wear and tear on tires, excessive noise pollution, and the like.

Another problem on and around airports is the amount of space needed between aircraft which are in the aircraft parking facility. Due to the breakaway and taxiing thrust it is necessary to leave substantial distances between aircraft at rest. As the number and size of aircraft increases, present airport terminals and facilities become too small, hence outmoding existing facilities due to lack of space.

Objects of the Invention

Accordingly, it is an object of this invention to move aircraft on the ground without the use of any external power but rather through the use of a self-contained taxiing system.

It is a further object of this invention to effect a fuel savings in an aircraft which is taxiing between a runway and the discharge center at an airport.

It is a further object of this invention to provide a means of reducing the manpower necessary to move an aircraft about an airport.

It is another object of this invention to eliminate the need for equipment external to the aircraft to move the aircraft about an airport.

It is a still further object of this invention to reduce the air, smoke, and noise pollution which is prevalent around today's airport facilities.

It is another object of this invention to reduce the wear and tear on aircraft tires by effecting a spinning ("spin-up") of the wheels while the aircraft is in the air and just prior to landing.

It is a further object of this invention to drastically reduce and even eliminate, the "breakway" or taxi thrust which is needed to get today's aircraft moving and sustain its movement about the airfield.

It is yet another object of this invention to reduce the amount of spacing of aircraft on taxiways prior to ascent by reducing and even eliminating the breakaway and taxi thrust.

It is a further object of this invention to effect a noise reduction and hearing damage reduction on and around airport facilities.

It is a further object of this invention to extend the useful life of present airport facilities.

It is yet another object of this invention to eliminate engine ingestion problems which occur on terminal ramps and taxiways.

It is yet a further object of this invention to eliminate the need for wider taxiways for purposes of protecting aircraft jet engines from ingestion.

These and other objects of this invention will be apparent to those skilled in the art as this description proceeds.

BRIEF DESCRIPTION OF THE INVENTION

Briefly this invention is an integral self-contained aircraft taxiing system. More specifically, this invention is the use of a totally self-contained system that is a part of the aircraft at all times and which does not require ground equipment of any type whatsoever to move the aircraft while it is on the ground. As is well-known in the aircraft industry, practically all jet aircraft carry an auxiliary power unit (APU) which in effect is an "extra" engine. By this invention said "extra" engine can be utilized as the primary energy source to drive and power the system herein disclosed. Those aircraft which do not carry an APU can be made to move about the airport facility in a much improved manner by using one or more of the jet engines as the primary energy source to power the system herein disclosed. Of course, even if the aircraft is designed with an APU, one or more of the jet engines can be used, although the APU is much more desirable. This primary energy source is used to power a mechanism which drives the wheels of the aircraft at a sufficient speed to permit taxiing without any additional external or other internal assistance. This mechanism can be of a type such as electric, pneumatic, or preferably hydraulic, and the like.

FIG. 1 is a schematic drawing of this invention wherein the system is powered hydraulically. FIGS. 2–4 are varying views of the aircraft showing the varying locations of the energy sources. FIG. 5 shows the aircraft turning a corner when taxiing by the self-contained apparatus of the invention.

DETAILED DESCRIPTION OF THE INVENTION

Figure 1:
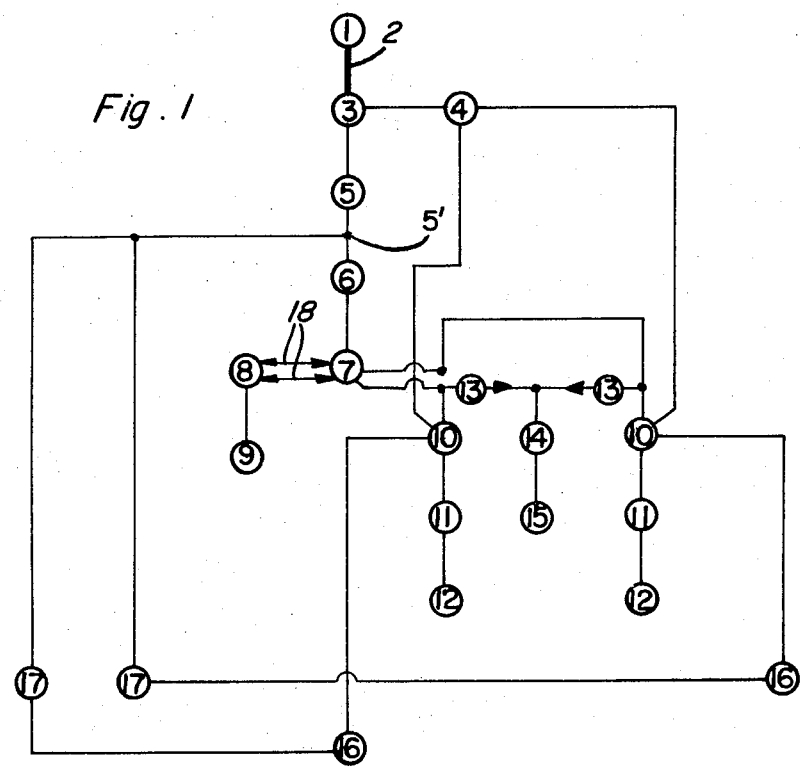

This invention is a self-contained aircraft taxiing system whereby a primary energy source contained in or on the aircraft supplies power to a means for driving the wheels of the aircraft, thereby moving the aircraft without the necessity of any external (to the aircraft) power source. Typical of the primary energy source is an airborne auxiliary power unit (APU) which is present on most large aircraft or one or more (preferably one) of the aircraft's engines if the aircraft is not APU equipped. The primary energy source is then harnessed through the use of mechanisms well-known to those skilled in the art. This invention does not have as its intent the introduction into the art of new equipment. Rather, this invention is the recognition that it is possible and desirable to move aircraft on the ground without any external power, ground equipment, or aircraft engine thrust, and a system of apparatus to accomplish this goal. It is not the intent of the inventors to be limited to any particular piece of equipment used herein in describing this invention more particularly.

In general the system described herein comprises the following:
a. a primary energy source;
b. a power transmitting means;
c. an energy couple means which connects the primary energy source and the power transmitting means;
d. a wheel drive control means;
e. a connecting means which connects the power transmitting means and the wheel drive control means; and
f. means for controlling the power transmitting means from within the aircraft.

It is to be understood that the wheel drive control means encompasses that equipment which is necessary to effect a rotation of the aircraft's wheels to move the aircraft. These means are, of course, present on all modern aircraft.

The connecting means depends upon the type of power transmitting means chosen. If the power transmitting means is hydraulic, the connecting means is a hydraulic pump via suitable fluid conduits; if the power transmitting means is pneumatic, the connecting means is a pneumatic compressor via suitable fluid conduits etc.

In one particular embodiment of this invention the system comprises the following:
a. a primary energy source;
b. a power transmitting means;
c. an energy couple means which connects the primary energy source and the power transmitting means;
d. a pressure regulating device (when the system is operated by hydraulic or pneumatic means) or a voltage and/or current regulator (when the system is operated by electric means) which connects the power transmitting means to a wheel speed/torque drive control means which is operated from the cockpit of the aircraft.
e. the wheel speed/torque drive control means;
f. a wheel drive speed/torque flow directing and restricting means connected to the wheel speed/torque drive control means;
g. an optional nose wheel steering control means which is connected to the wheel drive speed/torque flow directing and restricting means;
h. an optional nose gear steering drive means which is connected to the nose wheel steering control means;
i. wheel brakes;
j. wheel brake control means connected to the wheel brakes and the wheel speed/torque drive control means;
k. a rapid action unloading and/or bypassing means (when the system is operated hydraulically or pneumatically) which performs the function of a control means to prevent an undesirable interaction of forces which would degrade normal brake operation;
l. a main wheel drive mechanism;
m. a main wheel drive reversing means connected to the rapid action unloading and/or bypassing means and the main wheel drive mechanism;
n. a check valve means connected to said wheel drive speed/torque flow directing and restricting means;
o. an optional nose wheel reversing means connected to said check valve means;
p. an optional nose wheel drive means connected to said nose wheel reversing means;
q. wheel brakes connected to said rapid action unloading control means; and
r. wheel brake control means connected to said wheel brakes and said wheel drive control means.

(The above-stated optional means are generally already existing on the aircraft).

The primary energy source used herein is preferably the aircraft's auxiliary power unit (APU), any one or more of the aircraft's engines, or any other airborne energy source.

The energy couple can be mechanical, electrical, pneumatic, hydraulic, etc. and provides the connection between the primary energy source and the power transmitter. The power transmitter is, of course, dependent upon the type which is chosen and serves to convert the energy produced by the primary source into a suitable form sufficient to drive or power the aircraft's main and/or nose wheels, thereby allowing the aircraft to be moved on the ground forward or rearward economically and efficiently without any external assistance. This system thereby allows the aircraft to be moved forward or rearward by the use of only the APU or with only one engine provided that the aircraft is not equipped with an APU.

A fuller understanding of this invention can be had by turning now to FIG. 1 which is a schematic drawing of this invention wherein the power transmitting means is hydraulic. In FIG. 1 typically a drive shaft will connect the primary energy source and the power transmitting means, i.e., a hydraulic pump. The energy couple 2, referred to above as typically a drive shaft connects the primary energy source 1 such as a Vickers auxilary power unit commercially available from Sperry Rand Corp., such as Basic Model No. MF1-235, which for purposes of simplifying the description will be referred to as the "power unit" and the hydraulic pump such as a Vickers PV3-205 commercially available from Sperry Rand Corp. (the Power transmitting means) 3. (It is to be understood that the "power unit" encompasses the auxiliary airborne power unit(s) (APU), the aircraft's engines (generally only one is necessary), or other airborne energy sources). The hydraulic pump 3 is connected to a hydraulic reservoir 4 and a pressure regulating means such as a pressure regulating valve commercially available from Waterman Hydraulic Corp. such as a Banked Series RS 19 -2 5 which in turn is connected to the main and/or nose wheel speed/torque drive control means 6 such as a needle valve which is controlled from the cockpit of the aircraft. A wheel drive speed/torque flow directing and restricting means 7 such as a directional control valve commercially available from Waterman Hydraulics Corp., such as a Model 1713 is connected to the main and/or nose wheel speed/torque drive control means 6. Typically the wheel drive speed/torque flow means 7 is a controllable tapered needle valve moving through calibrated orifices to supply fluid pressure as required which in turn provides the torque and/or horsepower available to the drive wheels. The wheel drive speed/torque flow means 7 is connected to the nose gear steering drive means 9 through the nose wheel steering control means 8 which turns the nose wheels as desired from the aircraft's cockpit. Said steering drive means 9 and steering control means 8 are both already present on the aircraft. The wheel drive speed/torque flow directing and restricting means 7 is, of course, also connected to the main wheel drive mechanism 12 (one for each main landing gear of the aircraft) as already on the aircraft through a main wheel drive reversing means 11 such as a directional control valve commercially available from Waterman Hydraulics Corp., such as a Model 1713 and a rapid action unloading means 10 such as an unloading valve commercially available from Waterman Hydraulics Corp., such as a Series 1500 valve which is activated by a sensing circuit which senses the increase in pressure which would degrade normal braking operation but for this unloading means. The restricting means 7 is also optionally connected to the nose wheel mechanism 15 through the nose wheel drive reversing means 14 and a check valve 13 such as commercially available from Waterman Hydraulics Corp., model 330 (the nose wheel drive mechanism being standard) which performs the function of providing non-balanced power to the main wheels to facilitate turning. The nose wheel drive reversing means 14 is typically a directional control valve commercially available from Waterman Hydraulics Corp., such as a Model 1713.

The wheel brakes 16 are connected to the pressure line 5 through the wheel brake control means 17 such as a pedal connected to a valve as is standard on aircraft and to the rapid action unloading means 10. The wheel brake control means 17 is operated from the aircraft's cockpit. In order to avoid hydraulic fluid loss the fluid can be redirected to the hydraulic fluid reservoir 4 from the rapid action unloading means 10.

18 is a synchronized mechanism typically such as an automatic load compensated counter balance valve commercially available from Waterman Hydraulics Corp., between the flow-directing and restricting means 7 and the wheel drive speed/torque flow means 8 which allows the restricting means to perform its function simply and easily by providing a change in the driving force proportional to the radius of the aircraft turn required.

As a means of a further describing the various components mentioned heretofore, it is to be understood that the primary energy source, preferably an APU is typically a kerosene burning auxiliary turbine engine as is now installed on numerous in-service jet aircraft which has the function of supplying the required shaft horsepower to drive the hydraulic pump (or other power transmitting means) via the energy couple. Such a component, i.e., the APU, is typically manufactured by Garrett-Airesearch Corp. The energy couple is typically a suitable mounting pad existing on the primary energy source equipped with a method of transmitting the shaft horespower to the power transmitting means. In its most simple form the energy couple would be a splined drive incorporated into the mounting pad. Most APUs now in service are so equipped. The splined drive along with the mounting pad studs connect the power transmitting means with the primary energy source and is the power path, or energy couple, from the APU to the power transmitting means. Such a component is also typically manufactured by Garret-Airesearch Corp. The typical hydraulic pump which may be used as the power transmitting means is typically a bent-axis, multiple piston, constant pressure, variable displacement, shaft driven hydraulic pump capable of supplying pressure in the 3,000–4,000 p.s.i. range and with flow capabilities suitable for the energy required. The Vickers (Sperry-Rand) Corporation is a typical manufacturer.

The hydraulic fluid reservoir as itemized heretofore is a pressure vessel suitable in volume to contain the required quantity of fluid and used to supply the pump and to provide a storage for return fluid. The Douglas Aircraft Company and the Boeing Aircraft Company are typical vendors of this type of equipment. The pressure regulator is typically a conventional regulated spring and poppet type that opens and relieves excess pressure when the pump attempts to overpressurize the system. The valve is pre-set to a desired pressure level. Relieved fluid pressure can then be directed to the reservoir.

The wheel speed/torque drive control valve functions as a "throttle" or "power valve" to control the amount of energy supplied to the wheels and accomplishes this by controlling the rate of fluid flow from the power transmitting means to the main wheel drive means and nose wheel drive mechanism (when used). Typically and in its simplest form the wheel speed/torque drive control means is a hand lever operated gate valve or hand screw operated needle valve. The object of this piece of equipment is to provide the aircraft crew, in the aircraft's cockpit, with a means of controlling the power and/or speed of the aircraft during the operation of this invention. The crew uses this device as a "throttle" during ground operations. By controlling the rate of flow from the power transmitting means to the main wheel drive means and nose wheel drive mechanism from zero to maximum the crew controls the aircraft ground speed from zero to maximum. Typically, a more sophisticated type would be a servo valve that positioned a sliding servo-piston in proportion to the strength of an electrical signal therefore providing the crew with a smaller-lighter control means in the form of a rheostat. As the crew demanded more power the strength of the electrical signal is increased and the servo-piston responds to the signal, thereby allowing more flow to the main wheel drive means and nose wheel drive mechanism. A basic type of electro-hydraulic servo-valve that accomplishes this task is currently manufactured by the Crane (Hydro-Aire) Corp. However, any valve capable of meeting the pressure and flow requirements and also capable of zero to maximum control would be suitable for this purpose.

The wheel drive speed/torque director and restrictor valve functions to provide "fluid differential" capability. By referring to FIG. 5, it can be seen that during a powered turn of an aircraft, the wheels inside the turning radius are required to turn slower than the wheels on the outside of the turning radius. Consequently, a means must be provided to "divide" the flow of fluid to the main wheel drive control means left side and right side into "separate circuits" while providing proper metering of the fluid flow to the main wheel control means left side and right side. Typically the wheel drive speed/torque director and restrictor valve, i.e. 7, is a cylindrical, three port valve consisting of a housing containing a double ended needle valve tapered on each end. Each tapered end operates within a circular-fixed orifice. The valve has one pressure inlet port and two pressure outlet ports; one pressure outlet for the main wheel control means left side and one for the right side. This component functions dynamically only when the crew elects to turn the aircraft. By connecting and synchronizing the main wheel control means and the nose wheel steering valve, i.e., 8 in FIG. 1. This optional feature avoids the need for additional control duty by the flight crew. Therefore, when the crew turns the aircraft by activating the nose wheel drive means or mechanism by its connection — mechanical, cable, etc. — the wheel drive speed/torque director and restrictor valve, i.e., the flow means, positions itself to respond to the same degree of turn. The needle valve shifts, moving the increasingly larger tapered diameter of one end of the needle valve into the circular orifice therefore reducing its area thus allowing less fluid flow to the wheels that are inside the radius of turn. The opposite occurs on the opposite end of the valve, the tapered body of the needle valve moves out of the opposite circular orifice thereby allowing more fluid flow to the wheels on the outside radius of the turn. The needle is tapered such that the Zigma or total flow from both outlet ports is the same regardless of the position of the needle so that during turning no net power loss occurs, i.e., what one wheel losses, the other wheel gains. This function can also be achieved by using a double-ended piston type valve provided tapered metering slots are provided in the cylindrical wall of the housing allowing the pistons to expose more or less of the tapered slots to provide the metered right and/or left flow. An alternate electro-hydraulic method consists of using a servo valve similar to that described for the nose wheel drive control means 6 except that a "dual type" is used and the differential flow response is proportional to an electrical signal supplied by a potentiometer or rheostat synchronized with the nose wheel steeing control means 8.

The nose wheel steering control means 8, typically a valve, now exists on most aircraft and is typically a four way valve consisting of a pressure inlet, two pressure outlets and a return port. The valve is controlled by the aircraft's crew. The nose wheel steering drive means 9 is typically a simple push-pull hydraulic actuator consisting of a cylinder, piston and shaft which supplies the effort (work) involved in turning the nose gear. This, too, is controlled by the aircraft's crew and via the nose wheel steering control means. Of course, such is also now existing on most aircraft.

The rapid action unloading means 10 is primarily for the convenience of the crew. Without this valve the system would have to be shut down prior to operating the aircraft brakes. While this imposes no specific hardship on the crew, an automatic unloading, or by-passing valve, is more efficient and avoids the necessity of additional duties for the crew. Typically this valve consists of a housing containing one pressure inlet port, one pressure outlet port, one return port and one sensing port. The valve contains a spring loaded shuttle spool that normally connects the pressure inlet port to the pressure outlet port while blocking the return. As long as the wheel brake line pressure is below a pre-set pressure the valve remains in the normal position. If however, the aircraft's crew elects to stop without closing the nose wheel steering control means there would exist two hydraulic forces in opposition; one trying to stop the wheel by applying brakes and the other trying to turn the wheels by operation of the wheel drive mechanism 12. Therefore, this valve senses the pressure rise to the brakes and overcomes the shuttle spring, the shuttle rapidly shifts blocking the pressure inlet port and connecting the return port and pressure outlet port thereby unloading or dumping the driving fluid back to the reservoir 4 and allowing the brakes to function normally. Upon the release of the brakes the shuttle shifts back to the normal position as the brake line pressure falls and restores itself to the normal position thus allowing the wheel drive to commence. By referring to FIG. 1 it can be seen that there has not been shown a requirement for the rapid action unloading means in the optional circuit powering the nose wheel. This is because few aircraft, if any, contain nose wheel brakes thereby not having the need for corresponding pressure. As can be seen by those skilled in the art, if the aircraft did have nose brakes, a rapid action unloading means would then be required upstream of the nose wheel drive reversing means 14 and nose wheel drive mechanism 15, if the nose wheels were to be powered by this invention.

Also, in its most simple form this valve is a solenoid operated shuttle valve without a brake sensing port. A pressure switch, pre-set, may be installed in the wheel brake circuits which close at a pre-set level thus supplying power to the solenoid which would then move the shuttle to the unload or dump position. When the pressure in the brake line falls to the pre-set configuration the power is removed from the solenoid and by a spring it returns to the normal position. The thus described shuttle valves are available from any hydraulic manufacturer.

The main wheel drive reversing means is typically a standard four way electrical solenoid operated valve which is switch operated by the aircraft's crew and is used only when operating the main wheel drive mechanism 12 in forward or reverse by changing the direction of fluid flow. When the valve is in the forward drive position the main pressure port is connected to the wheel drive motor. At the same time the opposite port of the drive motor is connected to the return port of the valve and allows fluid to return to the reservoir. When reverse power is required the clockwise port is connected to the return port and the counterclockwise port is connected to the pressure port allowing reverse operation. This type of valve is commonly known to those skilled in the art as a four way - open center, four way - closed center, etc.

The main wheel drive mechanism or means 12 is typically a bent-axis multiple piston hydraulic motor such as a Vickers Model No. MF-3918 (Sperry-Rand Co.) It is coupled with a suitable clutch and gear box and has the function of driving the main wheels for ground operation of the aircraft. The check valve 13 is typically a poppet type valve that allows flow in one direction only. It is used as part of the "optimal" nose wheel drive circuit and is required to prevent degradation of the function of the wheel drive speed/torque flow means 7. During a turn when the wheel drive speed/torque flow means is supplying reduced flow to the wheels on the inside radius of the turn and also supplying increased flow from the outside radius of the turn, the nose wheel drive mechanism 15 and nose wheel drive reversing means 14 do not require such differential as the nose wheels are in close proximity to each other. Therefore, in a right hand turn 14 and 15 receive the majority of the flow from the left hand 15, the same circuit supplying the left hand main wheels, outside the turn radius position, while receiving only a small portion of flow from the right hand side. If the check valve was not used, the differential flow established by the wheel drive speed/torque flow means 7 could not be equalized and thus perform its function. Of course, in FIG. 1, a single line represents the two separate circuits as will be clear to those skilled in the art.

The nose wheel drive reversing means 14 is identical in form, fit and function to the main wheel drive reversing means 11. The nose wheel drive mechanism is identical in type to the main wheel drive mechanism 12 except in size as this item requires only the capability of providing only 10 percent of the net torque required to move the aircraft as only about 10 percent of the total weight of the aircraft normally rests on the nose wheels. A typical model is a Vickers MF-3907 commercially available from Sperry-Rand Co. The wheel brakes 16 are the existing aircraft main wheel brakes and are shown only to describe the complete organization of the invention. Such is also true of the wheel brake control means 17.

In operation the invention and acts to achieve motion of the aircraft without using the aircraft's engines are as follows: (1) the aircraft is parked and loaded with the crew on board; (2) the crew starts the APU which starts the hydraulic pump and establishes suction from the reservoir 4 and pressure output to the pressure regulating means 5 and main and/or nose wheel speed torque drive control means 6 (and to the wheel brakes 16 and wheel brake control means 17); (3) when ready to back away from the terminal the crew puts the main wheel drive reversing means 11 (and nose wheel drive reversing means 14 into reverse mode); (4) the crew slowly opens the main and/or nose wheel speed/torque drive control means 6 to apply power while steering with the nose wheel steering control means 8; (5) after backing away a proper distance the crew close the main and/or nose wheel speed/torque drive control means 6 and switches 11 and 14 into forward mode; (6) the crew opens the main and/or nose wheel-speed/torque drive control means 6 to the speed desired and taxis the aircraft to the take-off position steering with the nose wheel steering control means 8; (7) the crew closes the control means 6; (8) the crew starts the main engines and takes off routinely; and (9) upon landing the crew, at the end of the landing strip repeats the operations to the terminal, without assistance from the main engines or external vehicles.

Figure 2:
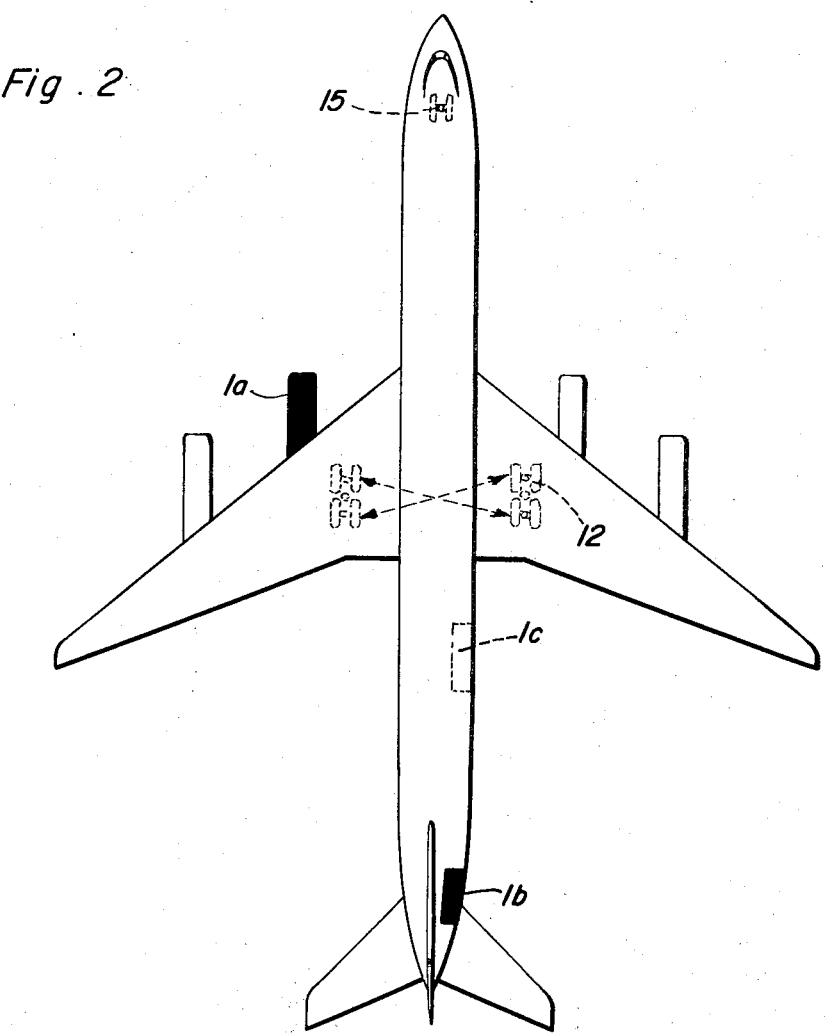

FIG. 2 is a top view of a typical aircraft showing various locations of the primary energy source. The energy source may be the auxiliary power unit (APU) wherein the aircraft is so equipped 1c, a wing mounted engine 1a, or a rear mounted engine 1b. 15 is the nose wheel drive mechanism and 12 is the main wheel drive mechanism.

Figure 3:
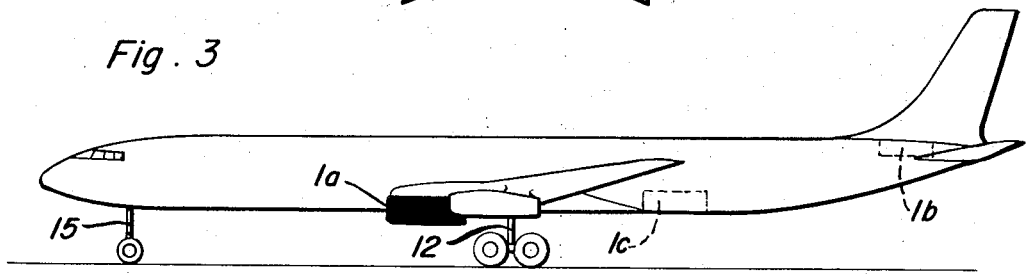
Figure 4:
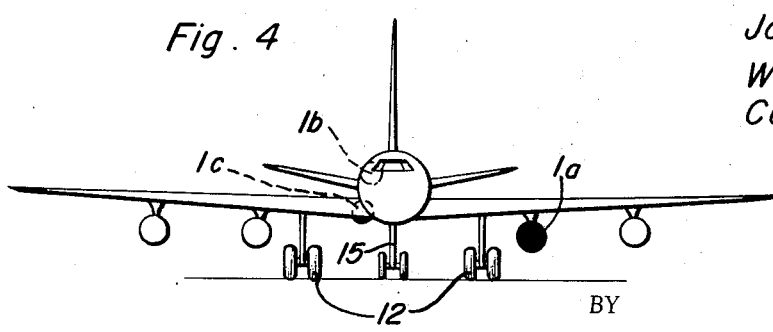

FIG. 3 is a side view of the same aircraft shown in FIG. 2 and FIG. 4 is a front view of that same aircraft.

Figure 5:
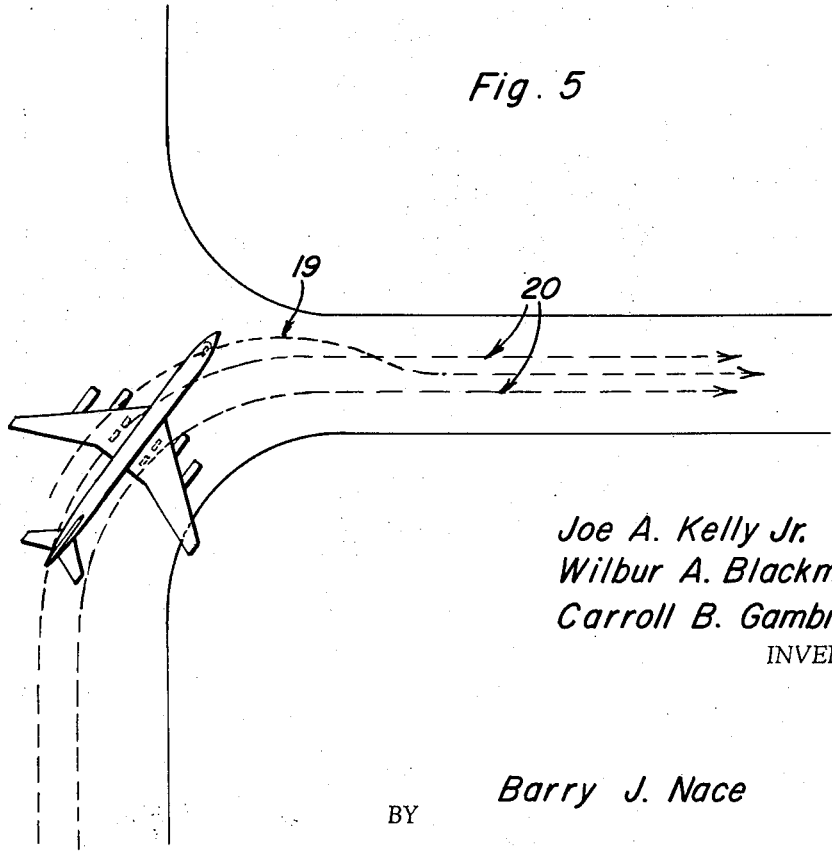

FIG. 5 shows how the aircraft is able to turn a corner. This type of turn is made possible due to the reversible wheel drive speed/torque flow directing and restricting means (7 in FIG. 1) which reduces the pressure flow to the drive wheels inside the turning radius and increases the pressure flow to the drive wheels outside the turning radius on a proportional basis. The nose gear tracks are labeled 19 and the main gear tracks are labeled 20.

Although the invention has been described heretofore in terms of a particular power transmitting means, hydraulic, other power transmitting means operate equally well with only minor variations. In FIG. 1 reference to 3 was to a hydraulic pump. However, 3 can also represent a pneumatic compressor or electric generator device. Naturally, when the system is not hydraulically controlled there is no need for a hydraulic reservoir (4). The pressure regulating means 5 is, of course, applicable for the use of either the hydraulic system or a pneumatic system. If the system were electrical 5 would instead be a voltage and current regulator. If the system were pneumatic, a pneumatic storage bottle and manifold would be necessary in the system between the pressure regulatory means 5 and the wheel drive speed/torque flow directing and restricting means 6. If the system were electrical 10 would be referred to as a switching means. The check valve 13 is applicable only to the hydraulic or pneumatic system. For an electrical system the check valve is replaced with a diode. For the pneumatic system a "vent" to the atomsphere would be provided at 10. The mechanism 18 between 7 and 8 is also synchronized for best results.

It is to be understood that for simplicity FIG. 1 shows only the general and essential connections between the components. Also, circuits are indicated by a single line regardless of whether a single or dual circuit is required. Also, return circuits to the resevoir are not shown as this, like the simplified diagram in FIG. 1, will be clear to those skilled in the art.

It is to be further understood that the preceding and other variations are fully understandable to those skilled in the art in view of the foregoing description based on a hydraulic system of operation.

The main wheel drive mechanism 12 typically consists of a driven gear mounted on the main wheels and driven by a drive gear which is connected or disconnected by hydraulic, electric or mechanical clutches or other suitable devices which in turn are powered by a torque converter or fluid coupling fluid motor or other suitable devices (if necessary) equipped with a speed reducing gear box between the input and output connections. In lieu of a driven and drive gear, an arrangement consisting of an expander tube and shoe assembly with built-in return springs is also suitable for powering the main wheels. The nose wheel drive mechanism 15 (optional) is typically similar to the main wheel drive mechanism 12.

The wheel drive speed/torque flow directing and restricting means 7 is typically essentially the same as the wheel drive speed/torque flow means except that its function is to provide a differential of power when required to reduce the power drive force on one set of drive wheels and at the same time to increase the power drive to the opposite wheels providing correct differential power in a turn. This restricting means is typically a controllable tapered needle valve which supplies equal power to all wheels except when the aircraft is required to turn.

The main wheel drive reversing means 11 consists typically of a mechanical, electrical, or pneumatic operated shuttle valve (or the like) which allows reverse drive force to be applied to the main wheels and allows the aircraft to be moved backward as required. The nose wheel drive reversing means 14 is also typically a mechanical, electrical, or pneumatic operated shuttle valve (or the like) which allows reverse drive force to be applied to the nose wheels and assists in moving the aircraft backward as required. This is, of course, optional with the use of the nose wheel drive mechanism 15.

It is claimed:

1. Self-contained apparatus useful for moving aircraft while said aircraft is on land which comprises:
   a. a primary energy source;
   b. a power transmitting means connected to and driven by said primary energy source;
   c. a main wheel drive control means;
   d. an energy regulating means connecting said power transmitting means and said main wheel drive control means;
   e. a wheel drive flow directing and restricting means for proportionately controlling relative flow during turning to a main wheel drive means, and being connected to said main wheel drive control means;
   f. a rapid action unloading control means connected to said wheel drive flow directing and restricting means;
   g. a main wheel drive reversing means connected to said rapid action unloading control means; and
   h. a main wheel drive means connected to said main wheel drive reversing means.

2. The apparatus according to claim 1 wherein said power transmitting means is electrical.

3. The apparatus according to claim 1 wherein said apparatus contains a nose wheel reversing means connected to a nose wheel drive means and a check valve means, said check valve means connected to said wheel drive flow directing and restricting means.

4. The apparatus according to claim 3 wherein said apparatus contains a nose wheel steering control means connected to said wheel drive flow directing and restricting means and a nose gear steering drive means connected to said nose wheel steering control means.

5. The apparatus according to claim 3 wherein said power transmitting means is electrical, said energy regulating means is a current regulator and said check valve control means is a diode.

6. The apparatus according to claim 1 wherein said primary energy source is at least one aircraft engine.

7. The apparatus according to claim 1 wherein said primary energy source is an auxiliary power unit.

8. The apparatus according to claim 1 wherein said primary energy source is an aircraft airborne energy source.

9. The apparatus according to claim 1 wherein said power transmitting means is a hydraulic pump and said hydraulic pump is connected to a hydraulic reservoir connected to said rapid action unloading control means.

10. The apparatus according to claim 1 wherein said power transmitting means is a pneumatic compressor and said rapid action unloading control means contains a vent to the atmosphere.

11. The self-contained apparatus according to claim 1 wherein said apparatus further contains :
    i. main wheel brakes connected to said rapid action unloading control means and
    j. wheel brake control means connected to said main wheel brakes and said main wheel drive control means.

12. Self-contained aircraft taxiing apparatus which comprises:
    a. an auxiliary power unit;
    b. a power transmitting means connected to and driven by said auxilary power unit;
    c. a main wheel drive control means;
    d. an energy regulating means connecting said power transmitting means and said main wheel drive control means;
    e. a wheel drive flow directing and restricting means for proportionately controlling relative flow during turning to a main wheel drive means, and being connected to said main wheel drive control means;

f. a rapid action unloading control means connected to said wheel drive flow directing and restricting means;

g. a main wheel drive reversing means connected to said rapid action unloading control means; and h. a main wheel drive means connected to said main wheel drive reversing means.

13. The self-contained apparatus according to claim 12 wherein said apparatus further contains:

i. main wheel brakes connected to said rapid action unloading control means and j. wheel brake control means connected to said main wheel brakes and said main wheel drive control means.

14. The self-contained aircraft taxiing apparatus according to claim 12 wherein said power transmitting means is a hydraulic pump, said energy regulating means is a pressure regulating means and a hydraulic reservoir is provided.

15. The self-contained aircraft taxiing apparatus according to claim 12 wherein said power transmitting means is a pneumatic compressor, said energy regulating means is a pressure regulating means and a pneumatic storage bottle and manifold are provided.

16. The self-contained aircraft taxiing apparatus according to claim 12 wherein said power transmitting means is an electric generator, said energy regulating means is a voltage and current regulator and a switching means and diode are provided.

17. The self-contained aircraft taxiing apparatus according to claim 12 wherein said restricting means is a tapered needle valve.

18. The apparatus according to claim 12 in combination with an airplane.

* * * * *